(12) United States Patent
Bjornsson et al.

(10) Patent No.: US 12,361,053 B2
(45) Date of Patent: **\*Jul. 15, 2025**

(54) VISUAL SEARCH VIA FREE-FORM VISUAL FEATURE SELECTION

(71) Applicant: Google LLC, Mountain View, CA (US)

(72) Inventors: Erica Bjornsson, Kentfield, CA (US); Heidi Wong, New York, NY (US)

(73) Assignee: GOOGLE LLC, Mountain View, CA (US)

( \* ) Notice: Subject to any disclaimer, the term of this patent is extended or adjusted under 35 U.S.C. 154(b) by 0 days.

This patent is subject to a terminal disclaimer.

(21) Appl. No.: 18/784,127

(22) Filed: Jul. 25, 2024

(65) Prior Publication Data

US 2024/0378235 A1    Nov. 14, 2024

Related U.S. Application Data

(63) Continuation of application No. 17/698,795, filed on Mar. 18, 2022, now Pat. No. 12,072,925.

(60) Provisional application No. 63/163,177, filed on Mar. 19, 2021.

(51) Int. Cl.
| | |
|---|---|
| *G06F 16/00* | (2019.01) |
| *G06F 3/0488* | (2022.01) |
| *G06F 16/532* | (2019.01) |
| *G06F 16/583* | (2019.01) |
| *G06Q 30/0601* | (2023.01) |

(52) U.S. Cl.
CPC ......... *G06F 16/532* (2019.01); *G06F 3/0488* (2013.01); *G06F 16/5846* (2019.01); *G06Q 30/0627* (2013.01); *G06Q 30/0643* (2013.01)

(58) Field of Classification Search
CPC ................ G06F 16/532; G06F 16/5846
See application file for complete search history.

(56) References Cited

U.S. PATENT DOCUMENTS

| | | | |
|---|---|---|---|
| 6,525,749 B1 \* | 2/2003 | Moran | G06F 40/166 |
| | | | 345/173 |
| 8,983,193 B1 \* | 3/2015 | Ordonez Roman | ........................ |
| | | | G06V 10/7784 |
| | | | 382/125 |
| 9,690,831 B2 \* | 6/2017 | Isaacs | G06F 16/332 |
| 10,528,645 B2 \* | 1/2020 | Kumar | G06F 16/338 |

(Continued)

*Primary Examiner* — Noosha Arjomandi
(74) *Attorney, Agent, or Firm* — DORITY & MANNING, P.A.

(57) ABSTRACT

A user can submit a visual query that includes one or more images with user free-form selected visual features of interest. Various processing techniques such as optical character recognition (OCR) techniques can be used to recognize text (e.g., in the image, surrounding image(s), etc.) and/or various object detection techniques (e.g., machine-learned object detection models, etc.) may be used to detect objects and particular visual features of objects (e.g., dress, sleeves, color, pattern, etc.) within or related to the visual query. Content related to the detected text or object(s) in combination with the user free-form selected visual feature of interest can be identified and potentially provided to a user as search results. As such, aspects of the present disclosure enable the visual search system to more intelligently process a visual query to provide improved search results and content feeds, including search results which are personalized to account for user search intent.

20 Claims, 5 Drawing Sheets

(56) References Cited

U.S. PATENT DOCUMENTS

| | | | | |
|---|---|---|---|---|
| 10,824,942 | B1* | 11/2020 | Bhotika | G06N 3/08 |
| 11,163,779 | B1* | 11/2021 | Kulikov | G06F 16/24568 |
| 11,354,349 | B1* | 6/2022 | Xu | G06N 3/04 |
| 2003/0050927 | A1* | 3/2003 | Hussam | G06F 16/34 |
| | | | | 707/999.005 |
| 2008/0263037 | A1* | 10/2008 | Cai | G06F 16/338 |
| 2011/0125735 | A1* | 5/2011 | Petrou | G06F 16/5838 |
| | | | | 707/723 |
| 2014/0143250 | A1* | 5/2014 | Martin | G06F 16/9535 |
| | | | | 707/737 |
| 2015/0170203 | A1* | 6/2015 | Kogan | G06F 16/338 |
| | | | | 707/774 |
| 2016/0360175 | A1* | 12/2016 | Takahashi | H04N 23/85 |
| 2018/0341808 | A1* | 11/2018 | Holzer | G06F 16/587 |
| 2019/0272425 | A1* | 9/2019 | Tang | G06T 19/006 |
| 2019/0318405 | A1* | 10/2019 | Hu | G06V 20/00 |
| 2019/0354609 | A1* | 11/2019 | Huang | G06F 16/24578 |
| 2020/0019628 | A1* | 1/2020 | Chen | G06F 16/35 |
| 2020/0081912 | A1* | 3/2020 | Hong | G06F 16/438 |
| 2021/0034634 | A1* | 2/2021 | Iyer | G06F 16/24578 |
| 2021/0064652 | A1* | 3/2021 | Wang | G06F 16/532 |
| 2021/0073295 | A1* | 3/2021 | Joyce | G06N 5/046 |
| 2022/0092105 | A1* | 3/2022 | Barros | G06F 16/9024 |
| 2022/0300550 | A1* | 9/2022 | Bjornsson | G06F 3/0488 |
| 2023/0315781 | A1* | 10/2023 | Huang | G06F 16/535 |
| | | | | 707/734 |

* cited by examiner

VISUAL SEARCH VIA FREE-FORM VISUAL FEATURE SELECTION

RELATED APPLICATIONS

The present application is a continuation of U.S. application Ser. No. 17/698,795 having a filing date of Mar. 18, 2022, which is based on and claims priority to U.S. Provisional Application No. 63/163,177 having a filing date of Mar. 19, 2021. Applicant claims priority to and the benefit of each of such application and incorporate all such applications herein by reference in its entirety.

FIELD

The present disclosure relates generally to systems and methods for processing visual search queries. More particularly, the present disclosure relates to a computer visual search system that leverages user input free-form selection of visual features to detect and recognize objects (and/or specific visual features thereof) in images included in a visual query to provide more personalized and/or intelligent search results.

BACKGROUND

Text-based or term-based searching is a process where a user inputs a word or phrase into a search engine and receives a variety of results. Term-based queries require a user to explicitly provide search terms in the form of words, phrases, and/or other terms. Therefore, term-based queries are inherently limited by the text-based input modality and do not enable a user to search based on visual characteristics of imagery.

Alternatively, visual query search systems can provide a user with search results in response to a visual query that includes one or more images. Computer visual analysis techniques can be used to detect and recognize objects in images. For example, optical character recognition (OCR) techniques can be used to recognize text in images and/or edge detection techniques or other object detection techniques (e.g., machine learning-based approaches) can be used to detect objects (e.g., products, landmarks, animals, etc.) in images. Content related to the detected objects can be provided to the user (e.g., a user that captured the image in which the object is detected or that otherwise submitted or is associated with the visual query).

However, certain existing visual query systems have a number of drawbacks. As one example, current visual search query systems and methods may provide a user with results that may only relate to the visual query with respect to visual characteristics of the query image as a whole, such as the same general color scheme or depicting the same items/objects as the image(s) of the visual query. Stated differently, certain existing visual query systems focus exclusively on identifying other images that contain holistically similar visual characteristics to the query image(s) as a whole, which may fail to reflect the user's true search intent.

Accordingly, a system that can more intelligently process a visual query to provide the user with improved search results would be desirable.

SUMMARY

Aspects and advantages of embodiments of the present disclosure will be set forth in part in the following description, or can be learned from the description, or can be learned through practice of the embodiments.

One example aspect of the present disclosure is directed to a computer-implemented method for free-form user selection of visual features for visual search. The method comprises providing for display within a user interface, by a computing system comprising one or more computing devices, an image that depicts one or more objects. The method comprises receiving, by the computing system, a free-form user input to the user interface that selects a particular sub-portion of the one or more objects depicted by the image, wherein the particular sub-portion comprises one or more visual features. The method comprises providing to a visual search system, by the computing system, a visual search query that comprises the particular sub-portion of the object selected by the free-form user input. The method comprises, in response to the visual search query, the method comprises the computing system receiving from the visual search system a set of visual search results responsive to visual features included in the particular sub-portion of the one or more objects. The method comprises providing one or more of the set of visual search results to a user.

Another example aspect of the present disclosure is directed to a computing system that returns content for specific visual features responsive to visual search queries. The computing system comprises one or more processors. The computing system comprises one or more non-transitory computer-readable media that store instructions that, when executed by the one or more processors, cause the computing system to perform operations. The operations comprise providing for display within a user interface, by the computing system, an image that depicts one or more objects. The operations comprise receiving, by the computing system, a free-form user input to the user interface that indicates a particular sub-portion of the one or more objects depicted by the image, wherein the particular sub-portion comprises one or more visual features. The operations comprise providing to a visual search system, by the computing system, a visual search query that comprises the particular sub-portion of the object indicated by the free-form user input. The operations comprise, in response to the visual search query, receiving from the visual search system, by the computing system, a set of visual search results responsive to visual features included in the particular sub-portion of the one or more objects. The operations comprise providing, one or more of the set of visual search results to a user.

Another example aspect of the present disclosure is directed to a computing system that returns content for specific visual features responsive to visual search queries, the computing system comprises one or more processors. The computing system comprises one or more non-transitory computer-readable media that store instructions that, when executed by the one or more processors, cause the computing system to perform operations. The operations comprise obtaining a visual search query, wherein the visual search query comprises an image that depicts a particular sub-portion of an object that has been selected by a user. The operations comprise accessing visual embeddings associated with candidate results to identify a first set of results associated with the object overall and a second set of results associated with the particular sub-portion of the object. The operations comprise selecting, based on the visual search query, a combined set of content that includes search results from both the first set of results and the second set of results.

The operations comprise, in response to the visual search query, returning the combined set of content as search results.

Other aspects of the present disclosure are directed to various systems, apparatuses, non-transitory computer-readable media, user interfaces, and electronic devices.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which makes reference to the appended figures, in which.

Figure 1:
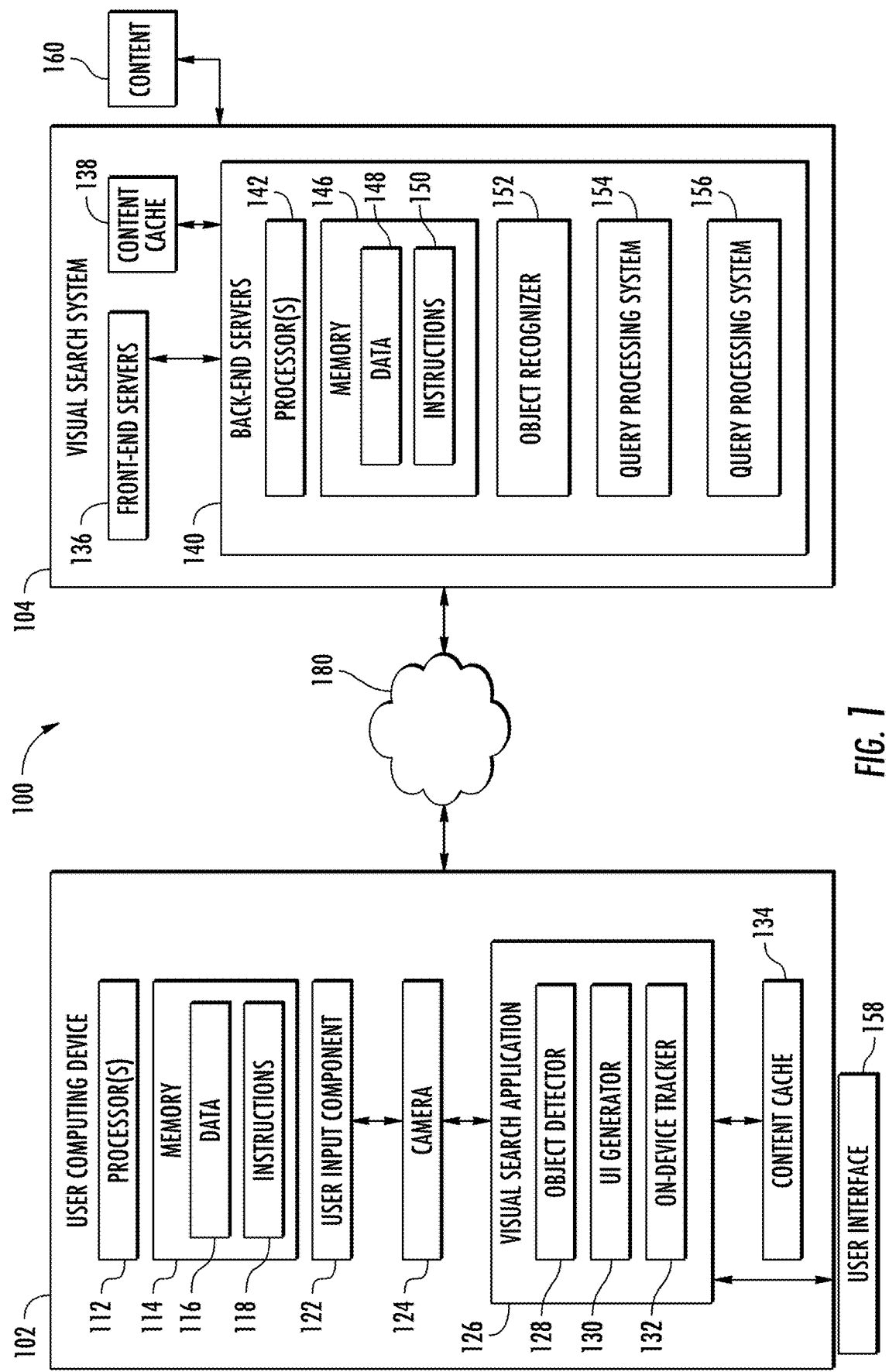
FIG. 1 depicts a block diagram of an example computing system according to example embodiments of the present disclosure.

Reference numerals that are repeated across plural figures are intended to identify the same features in various implementations.

DETAILED DESCRIPTION

Overview

Generally, the present disclosure is directed to a computer visual search system that leverages user input free-form selection of visual features to detect and recognize objects (and/or specific visual features thereof) in images included in a visual query to provide more personalized and/or intelligent search results. Aspects of the present disclosure enable the visual search system to more intelligently process a visual query to provide improved search results, including search results which are more personalized or user-driven or user-defined. Specifically, a computer visual search system can leverage free-form user input that selects one or more visual features depicted in an image. The search system can use the selected visual features to perform or refine a visual search to return results that are more specifically relevant to the selected visual features (e.g., as opposed to the image as a whole or specific semantic objects depicted in the image). Thus, a search system can provide a user with improved visual search results which are more directly relevant to specific, user-selected visual features.

A visual query can include one or more images. For example, the images included in the visual query can be contemporaneously captured imagery or can be previously existing images. In one example, a visual query can include a single image. In another example, a visual query can include ten image frames from approximately three seconds of video capture. In yet another example, a visual query can include a corpus of images such as, for example, all images included in a user's photo library.

According to one example aspect, a visual search system can leverage free-form user selection of visual features to provide more personalized search results. In one example use, the visual search system can use the free-form user selection of visual features to return a combined set of content responding to multiple visual features responsive to visual search queries. In particular, because visual search queries enable a more expressive and fluid modality of search input, both understanding the granularity and object(s) of user intent is a challenging task.

To provide an example, imagine that a user submits as a visual query a dress. There is a significant amount of variation in what the user intent could be in an image of a dress. The user could be interested in dresses which have one or more characteristics in common with the dress in the query image, such as length, color, sleeve type, collar style, fabric pattern, or some combination thereof. Thus, determining by a computing system which specific visual aspects a user is interested in given an image is a challenging problem. Conversely, understanding the intended granularity of a user's query is challenging. Continuing the dress example, a visual query that includes a dress with a brand logo on it may be intended to search for dresses that look like the dress in the image or other articles of clothing which are entirely different but produced by the same brand.

The present disclosure resolves these challenges by enabling the return of content responsive to visual features indicated as points of interest by user free-form input. In particular, in the context of a visual search query that includes an image depicting one or more objects, the computing system can receive a free-form user input to a user interface. More particularly, the free-form user input to the user interface can select a particular sub-portion of the image. The particular sub-portion can comprise one or more visual features. A visual search query can be constructed or refined based on the user input. For example, the visual search query can include the particular sub-portion of the object, for example, the particular sub-portion of the object selected by the free-form user input.

Furthermore, the computing system can receive from the visual search system a set of visual search results. The visual search results can be responsive to visual features, such as visual features included in the particular sub-portion of the one or more objects in the image. The computing system can then provide one or more of the set of visual search results to a user. To continue the example above, while certain existing systems may return content related only to dresses that look nearly identical to the dress in the image, if the user input has selected the sleeves of the dress in the query image then the proposed system may return content related to dresses that are different in color and shape but have the same style of sleeves.

Various techniques can be used to enable the free-form user input of particular sub-portions of an image containing one or more visual features. In one example, an initial query image provided or selected by the user can be displayed within a user interface. Even more particularly, the image can be displayed on a touch sensitive display device. Thus, the free-form user input can be received by the touch sensitive display device.

In one example, the free-form user input to the user interface can be illustrated using a swathe of translucent color overlayed on a particular sub-portion of the object. The particular sub-portion of the object can be selected by free-form user input. Selecting the particular sub-portion of the object by free-form user input can indicate that the particular sub-portion of the one or more objects depicted by the image has been selected by the user. Specifically, a user can drag a tactile object (e.g., finger, stylus, etc.) over the image provided for display within the user interface and, in response, the user interface can overlay the swathe of translucent color wherever the tactile object touches (e.g., in a highlighting manner). Alternatively, a user can use any method of interacting with a display within a user interface (e.g., a mouse) to overlay the swathe of translucent color using any method known in the art (e.g., click and drag). Continuing the example from above, the user can drag a finger across an image of a dress's sleeve to overlay a swathe of translucent color over the sleeve of the dress. Thus, the visual query may provide visual search results of dresses with the same style of sleeve.

In another example, the free-form user input to the user interface can be a user input that selects a subset of pixels. In particular, the subset of pixels can be selected by the user from a plurality of pixels. The pixels can be specific image pixels or groups of image pixels that are grouped together. More particularly, the plurality of pixels can be derived from dividing the image depicting one or more objects into the plurality of pixels. Even more particularly, the subset of pixels selected by the user from the plurality of pixels can comprise at least two groups of selected pixels which are separate from each other. Stated differently, the subset of pixels selected by the user from the plurality of pixels can comprise at least two groups of selected pixels which are non-adjacent to each other. The particular subset of pixels can be selected by free-form user input. Selecting the particular sub-portion of the object by free-form user input can indicate that the particular sub-portion of the one or more objects depicted by the selected pixels in the image has been selected by the user.

Specifically, in some implementations, a user can drag a tactile object (e.g., finger, stylus, etc.) over the image provided for display within the user interface to indicate which pixels are part of the sub-portion of the image containing the visual feature of interest (e.g., pixels may indicate being selected by changing colors). Alternatively, a user can use any method of interacting with a display within a user interface (e.g., a mouse) to indicate which pixels should be selected using any method known in the art (e.g., click and drag).

Continuing the example from above, the user can drag a finger across an image of both of a dress's sleeves to select the pixels over both sleeves of the dress and nothing in between. Thus, the visual query may provide visual search results of dresses with the same style of sleeve. As another example, the user can drag a finger across an image of both of a dress's sleeves and a bow to select the pixels over both sleeves and the bow of the dress where the sleeves and the bow are not connected by any pixels. Thus, the visual query may provide visual search results of dresses with the same style of sleeve and a bow.

In another example, the free-form user input to the user interface can be a line drawn in a loop around a particular sub-portion of the object. The particular sub-portion of the object can be selected by free-form user input. Selecting the particular sub-portion of the object by free-form user input can indicate that the particular sub-portion of the one or more objects depicted by the image has been selected by the user. Specifically, a user can drag a tactile object (e.g., finger, stylus, etc.) over the image provided for display within the user interface to draw a line wherever the tactile object touches (e.g., as if drawing with a pen or pencil, click and slide to increase size of circle, etc.). Alternatively, a user can use any method of interacting with a display within a user interface (e.g., a mouse) to draw a loop using any method known in the art (e.g., click and drag, click and slide, etc.). Continuing the example from above, the user can drag a finger around an image of a dress's sleeve to draw a loop over the sleeve of the dress. Thus, the visual query may provide visual search results of dresses with the same style of sleeve.

In another example, one or more initial visual feature suggestions may be provided by the computing system. In particular, one or more initial visual features may be indicated as suggested visual features for the user to select. The one or more initial visual features may be indicated in any method suitable (e.g., marker icon overlay on visual feature, loop around visual feature, etc.)

Furthermore, in some implementations, an input mode toggle may be available on the user interface, wherein the input mode toggle may allow a user to choose whether to remain in the initial visual feature suggestion mode or switch (e.g., by touching, sliding, or otherwise engaging the toggle) to a free-form user selection mode. The computing system can receive a user selection of an input mode toggle. Responsive to the user selection of the input mode toggle, the computing system can place the user interface in a free-form user selection mode.

Thus, example techniques are provided which enable a visual search system to leverage user input such as free-form selection of visual features to more intelligently process a visual query and return content based on the free-form selection of visual features provided by the visual query that the user provides.

According to another aspect, the computer-implemented visual search system can return content for specific visual features while retaining features of the object in the image of a visual query as a whole responsive to a visual search query. It can be difficult to search, especially in visual queries, for objects with a general essence or semantic meaning of the object in the original query but particularly focusing on specific visual features. In particular, a user may desire to retain some aspects of an object as a whole while also focusing on particular visual features specifically when making a visual query. For example, a user may submit an image of a dress and indicate particular interest in the sleeves. However, rather than returning results of shirts, dresses, jumpsuits, and rompers with those particular sleeves, the user may desire to search for only dresses with the particular sleeves. It can be difficult for the fluid visual search to layer such subtleties of user desire and produce results.

Some example implementations of the present disclosure can resolve these challenges by generating and ranking search results by a first set of results and a second set of results and returning a combined set of content. Specifically, the computing system can obtain a visual search query. The search query can comprise an image that depicts a particular sub-portion of an object that has been selected by a user (e.g., by free-form, preselected suggestion, etc.). The computing system can access visual embeddings associated with candidate results to identify a first set of results associated with the object overall. More particularly, the first set of results can be associated with visual features of the object overall. The computing system can also access visual embeddings associated with candidate results to identify a second set of results associated with the particular sub-portion of the object. More particularly, the second set of results can be associated with visual features of the particular sub-portion.

The computing device can select based on the visual search query a combined set of content that includes search results from both the first set of results and the second set of results. The computing device can return the combined set of content as search results in response to the visual search query. As one example, the combined set can include items at an intersection of the first and second sets of results. In another example, top ranked items from each set can be included in the combined set. In yet another example, respective scores from the first and second sets can be summed to generate a ranking for inclusion in the combined set. To continue the example given above, the visual search system can use the first set of results and the second set of results to return content containing only dresses with the particular style of sleeves rather than any arbitrary article of clothing with the particular style of sleeves.

In one example, the combined set of content can be ranked by the object overall embedding first and the particular sub-portion embedding second. Alternatively, the combined set of content can be ranked by the particular sub-portion embedding first and the object overall embedding second. Continuing the example given above, the combined set of content may prioritize results with the particular sleeves indicated by the user, or the combined set of content may prioritize results that are dresses. Additionally, the results can be filtered such that only content with embeddings indicating likeness to both the overall and to the particular sleeves are available to return, however the content may be ranked based on the overall embedding likeness, particular sub-portion likeness, or some average of the two. When averaging the two likenesses together, the average can be more heavily weighted towards either the overall or particular sub-portion embedding similarity.

Thus, example techniques are provided which enable a visual search system to leverage user input of visual features of visual interest while balancing the features of the object in the image as a whole to more intelligently process a visual query and return content based on the free-form selection of visual features provided by the visual query that the user provides.

With reference now to the Figures, example embodiments of the present disclosure will be discussed in further detail.

Example Devices and Systems

FIG. 1 depicts a block diagram of an example computing system 100 that performs personalized and/or intelligent searches in response to at least in part visual queries according to example embodiments of the present disclosure. The computing system 100 includes a user computing device 102 and a visual search system 104 that are communicatively coupled over a network 180.

The user computing device 102 can be any type of computing device, such as, for example, a personal computing device (e.g., laptop or desktop), a mobile computing device (e.g., smartphone or tablet), a gaming console or controller, a wearable computing device, an embedded computing device, or any other type of computing device.

The user computing device 102 includes one or more processors 112 and a memory 114. The one or more processors 112 can be any suitable processing device (e.g., a processor core, a microprocessor, an ASIC, a FPGA, a controller, a microcontroller, etc.). and can be one processor or a plurality of processors that are operatively connected. The memory 114 can include one or more non-transitory computer-readable storage mediums, such as RAM, ROM, EEPROM, EPROM, flash memory devices, magnetic disks, etc., and combinations thereof. The memory 114 can store data 116 and instructions 118 which are executed by the processor 112 to cause the user computing device 102 to perform operations.

In some implementations, the visual search application 126 of a user computing device 102 presents content related to objects recognized in a viewfinder of a camera 124 of the user computing device 102. Alternatively, objects can be recognized which are currently displayed on a user interface 158 of the device 102. For example, the search application 126 can analyze images included in a webpage currently being shown in a browser application of the device 102.

The visual search application 126 can be a native application developed for a particular platform. The visual search application 126 can control the camera 124 of the user computing device 102. For example, the visual search application 126 may be a dedicated application for controlling the camera, a camera-first application that controls the camera 124 for use with other features of the application, or another type of application that can access and control the camera 124. The visual search application 126 can present the viewfinder of the camera 124 in user interfaces 158 of the visual search application 126.

In general, the visual search application 126 enables a user to view content (e.g., information or user experiences) related to objects depicted in the viewfinder of the camera 124 and/or view content related to objects depicted in images stored on the user computing device 102 or stored at another location accessible by the user computing device 102. The viewfinder is a portion of the display of the user computing device 102 that presents a live image of what is in the field of the view of the camera's lens. As the user moves the camera 124 (e.g., by moving the user computing device 102), the viewfinder is updated to present the current field of view of the lens.

The visual search application 126 can, in some implementations, an object detector 128, a user interface generator 130, and/or an on-device tracker 132. The object detector 128 can detect objects in the viewfinder using edge detection and/or other object detection techniques. In some implementations, the object detector 128 includes a coarse classifier that determines whether an image includes an object in one or more particular classes (e.g., categories) of objects. For example, the coarse classifier may detect that an image includes an object of a particular class, with or without recognizing the actual object.

The coarse classifier can detect the presence of a class of objects based on whether or not the image includes (e.g., depicts) one or more features that are indicative of the class of objects. The coarse classifier can include a light-weight model to perform a low computational analysis to detect the presence of objects within its class(es) of objects. For example, the coarse classifier can detect, for each class of objects, a limited set of visual features depicted in the image to determine whether the image includes an object that falls within the class of objects. In a particular example, the coarse classifier can detect whether an image depicts an object that is classified in one or more of classes including but not limited to: text, barcode, landmark, people, food, media object, plant, etc. For barcodes, the coarse classifier can determine whether the image includes parallel lines with different widths. Similarly, for machine-readable codes (e.g., QR codes, etc.), the coarse classifier can determine whether the image includes a pattern indicative of the presence of a machine-readable code.

The coarse classifier can output data specifying whether a class of object has been detected in the image. The coarse classifier can also output a confidence value that indicates the confidence that the presence of a class of object has been detected in the image and/or a confidence value that indicates the confidence that an actual object, e.g., a cereal box, is depicted in the image.

The object detector 128 can receive image data representing the field of view of the camera 124 (e.g., what is being presented in the viewfinder) and detect the presence of one or more objects in the image data. If at least one object is detected in the image data, the visual search application 126 can provide (e.g., transmit) the image data to a visual search system 104 over the network 180. As described below, the visual search system 104 can recognize objects in the image data and provide content related to the objects to the user computing device 102.

Although the visual search application 126 is shown in FIG. 1 as being included in the device 102, in other implementations some or all of the functionality of the visual search application 126 can be implemented at the visual search system 104.

The visual search system 104 includes one or more front-end servers 136 and one or more back-end servers 140. The front-end servers 136 can receive image data from user computing devices, e.g., the user computing device 102 (e.g., from the visual search application 126). The front-end servers 136 can provide the image data to the back-end servers 140. The back-end servers 140 can identify content related to objects recognized in the image data and provide the content to the front-end servers 136. In turn, the front-end servers 136 can provide the content to the mobile device from which the image data was received.

The back-end servers 140 includes one or more processor(s) 142 and a memory 146. The one or more processor(s) 142 can be any suitable processing device (e.g., a processor core, a microprocessor, an ASIC, a FPGA, a controller, a microcontroller, etc.). and can be one processor or a plurality of processors that are operatively connected. The memory 146 can include one or more non-transitory computer-readable storage mediums, such as RAM, ROM, EEPROM, EPROM, flash memory devices, magnetic disks, etc., and combinations thereof. The memory 146 can store data 148 and instructions 150 which are executed by the processor(s) 142 to cause the visual search system 104 to perform operations. The back-end servers 140 can also include object recognizer 152, a query processing system 154, and a ranking system 156. The object recognizer 152 can process image data received from mobile devices (e.g., user computing device 102, etc.) and recognize objects, if any, in the image data. As an example, the object recognizer 152 can use computer vision and/or other object recognition techniques (e.g., edge matching, pattern recognition, greyscale matching, gradient matching, etc.) to recognize objects in the image data.

In some implementations, the visual search system 104 includes or is otherwise implemented by one or more server computing devices. In instances in which the visual search system 104 includes plural server computing devices, such server computing devices can operate according to sequential computing architectures, parallel computing architectures, or some combination thereof.

In some implementations, the query processing system 154 includes multiple processing systems. One example system can allow the system to identify a plurality of candidate search results. For instance, the system can identify a plurality of candidate search results upon first receiving a visual query image. On the other hand, the system can identify a plurality of search results after further processing by the system has already been done. Specifically, the system can identify a plurality of search results based on a more targeted query that the system has generated. Even more particularly, a system can generate a plurality of candidate search results when the system first receives a visual query image and then regenerate a plurality of candidate search results after further processing, based on a more targeted query that the system has generated.

As another example, the query processing system 154 can include a system related to a combined set of content. More particularly, the combined set of content can refer to multiple items that are responsive to a first set of content related to the object presented in the image as a whole and a second set of content related to the particular visual feature of interest selected by a user in the visual search query.

In some implementations, the ranking system 156 can be used in multiple different points of the visual search system process to rank the candidate search results. One example application is to generate a ranking of the search results after the plurality of search results is first identified. On the other hand, the initial search results may be only preliminary, and the ranking system 156 can generate a ranking of the search results after the query processing system has created a more targeted query. Even more particularly, the ranking system 156 can generate a ranking of the plurality of candidate search results when the system first identifies a set of candidate search results and then again after a more targeted query has been made (e.g., the preliminary ranking may be used to determine what combinations of whole object and specific visual feature are most likely). The ranking that is created by the ranking system 156 can be used to determine the final output of the candidate search results to the user by determining what order the search results will be output in, and/or whether the candidate search result will be output or not.

The multiple processing systems contained in the query processing system 154 can be used in any combination with each other and in any order to process the visual queries submitted by users in the most intelligent way in order to provide the user with the most intelligent results. Furthermore, the ranking system 156 can be used in any combination with the query processing system 154.

After the content is selected, the content can be provided to the user computing device 102 from which the image data was received, stored in a content cache 138 of the visual search system 104, and/or stored at the top of a memory stack of the front-end servers 136. In this way, the content can be quickly presented to the user in response to the user requesting the content. If the content is provided to the user computing device 102, the visual search application 126 can store the content in a content cache 134 or other fast access memory. For example, the visual search application 126 can store the content for an object with a reference to the object so that the visual search application 126 can identify the appropriate content for the object in response to determining to present the content for the object.

In some implementations, the visual search system 104 includes the object detector 128, e.g., rather than the visual search application 126. In such examples, the visual search application 126 can transmit image data to the visual search system 104 continuously, e.g., in a stream of images, while the visual search application 126 is active or while the user has the visual search application 126 in a request content mode. The request content mode can allow the visual search application 126 to send image data to the visual search system 104 continuously in order to request content for objects recognized in the image data. The visual search system 104 can detect objects in the image, process the image (e.g., select visual indicators for the detected objects), and send the results (e.g., visual indicators) to the visual search application 126 for presentation in the user interface (e.g., viewfinder). The visual search system 104 can also continue processing the image data to recognize the objects, select content for each recognized object, and either cache the content or send the content to the visual search application 126.

In some implementations, the visual search application 126 includes an on-device object recognizer that recognizes objects in image data. In this example, the visual search application 126 can recognize the objects, and either request content for the recognized objects from the visual search system 104 or identify the content from an on-device content data store. The on-device object recognizer can be a lightweight object recognizer that recognizes a more limited set of objects or that uses less computationally expensive object recognition techniques than the object recognizer 152 of the visual search system 104. This enables mobile devices with less processing power than typical servers to perform the object recognition process. In some implementations, the visual search application 126 can use the on-device recognizer to make an initial identification of an object and provide the image data to the visual search system 104 (or another object recognition system) for confirmation. The on-device content data store may also store a more limited set of content than the content data storage unit 160 or links to resources that include the content to preserve data storage resources of the user computing device 102.

The user computing device 102 can also include one or more user input components 122 that receive user input. For example, the user input component 122 can be a touch-sensitive component (e.g., a touch-sensitive display screen or a touch pad) that is sensitive to the touch of a user input object (e.g., a finger or a stylus). The touch-sensitive component can serve to implement a virtual keyboard. Other example user input components include a microphone, a traditional keyboard, or other means by which a user can provide user input.

The network 180 can be any type of communications network, such as a local area network (e.g., intranet), wide area network (e.g., Internet), or some combination thereof and can include any number of wired or wireless links. In general, communication over the network 180 can be carried via any type of wired and/or wireless connection, using a wide variety of communication protocols (e.g., TCP/IP, HTTP, SMTP, FTP), encodings or formats (e.g., HTML, XML), and/or protection schemes (e.g., VPN, secure HTTP, SSL).

FIG. 1 illustrates one example computing system that can be used to implement the present disclosure. Other different distributions of components can be used as well. For example, some or all of the various aspects of the visual search system can instead be located and/or implemented at the user computing device 102.

Example Methods

Figure 4:
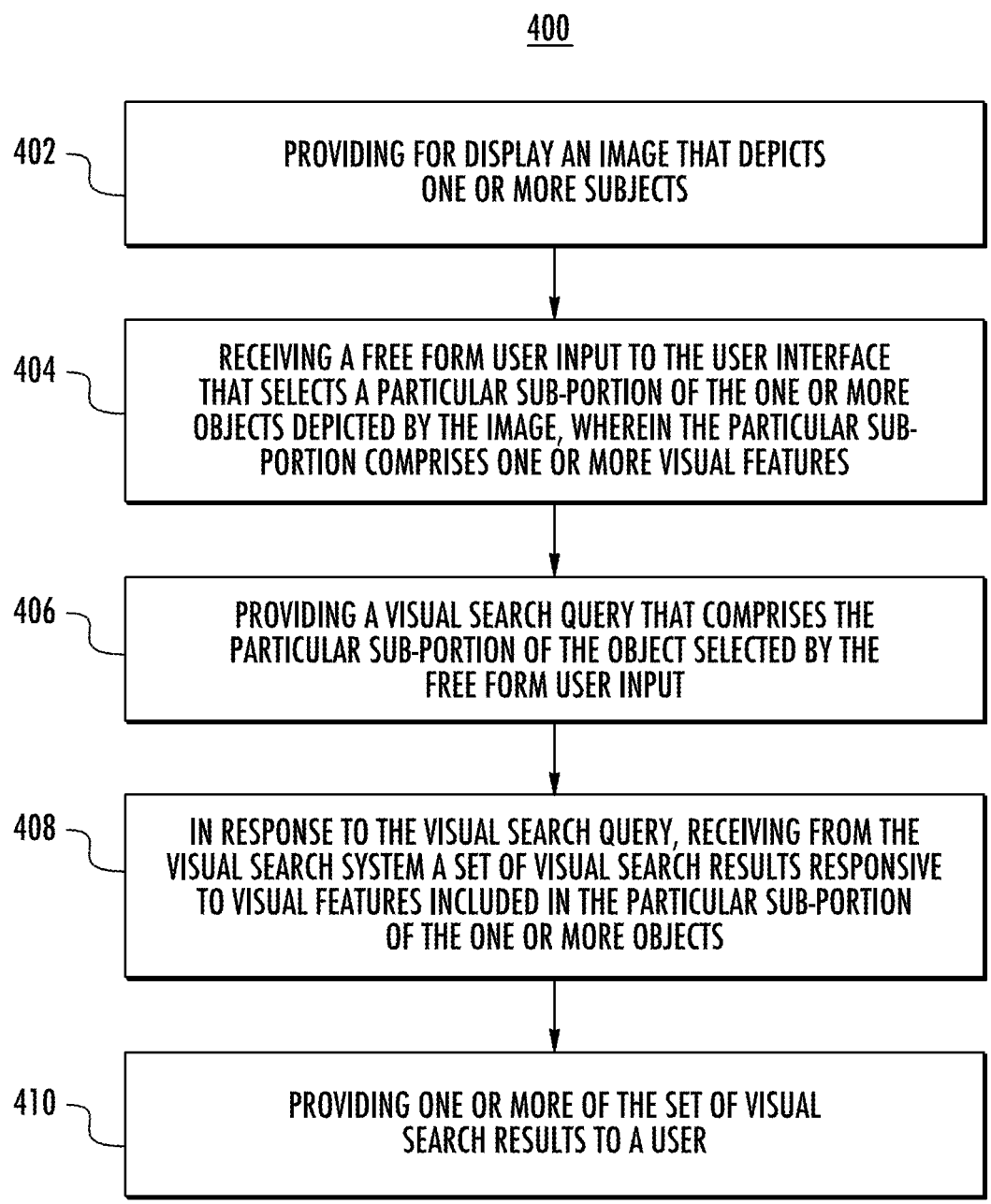
FIG. 4 depicts a flow chart diagram of an example method to perform a more personalized and/or intelligent visual search leveraging free-form user input according to example embodiments of the present disclosure.

FIG. 4 depicts a flow chart diagram of an example method 400 to provide more personalized search results according to example embodiments of the present disclosure. Although FIG. 4 depicts steps performed in a particular order for purposes of illustration and discussion, the methods of the present disclosure are not limited to the particularly illustrated order or arrangement. The various steps of the method 400 can be omitted, rearranged, combined, and/or adapted in various ways without deviating from the scope of the present disclosure.

At 402, a computing system can provide an image that depicts one or more subjects for display. For example, a computing system (e.g., user computing device 102 and visual search system 104 in FIG. 1) can provide an image (e.g., from the camera 124 of FIG. 1) for display to a user (e.g., on a touch sensitive device such as a phone, tablet, computer, etc.).

Figure 2:
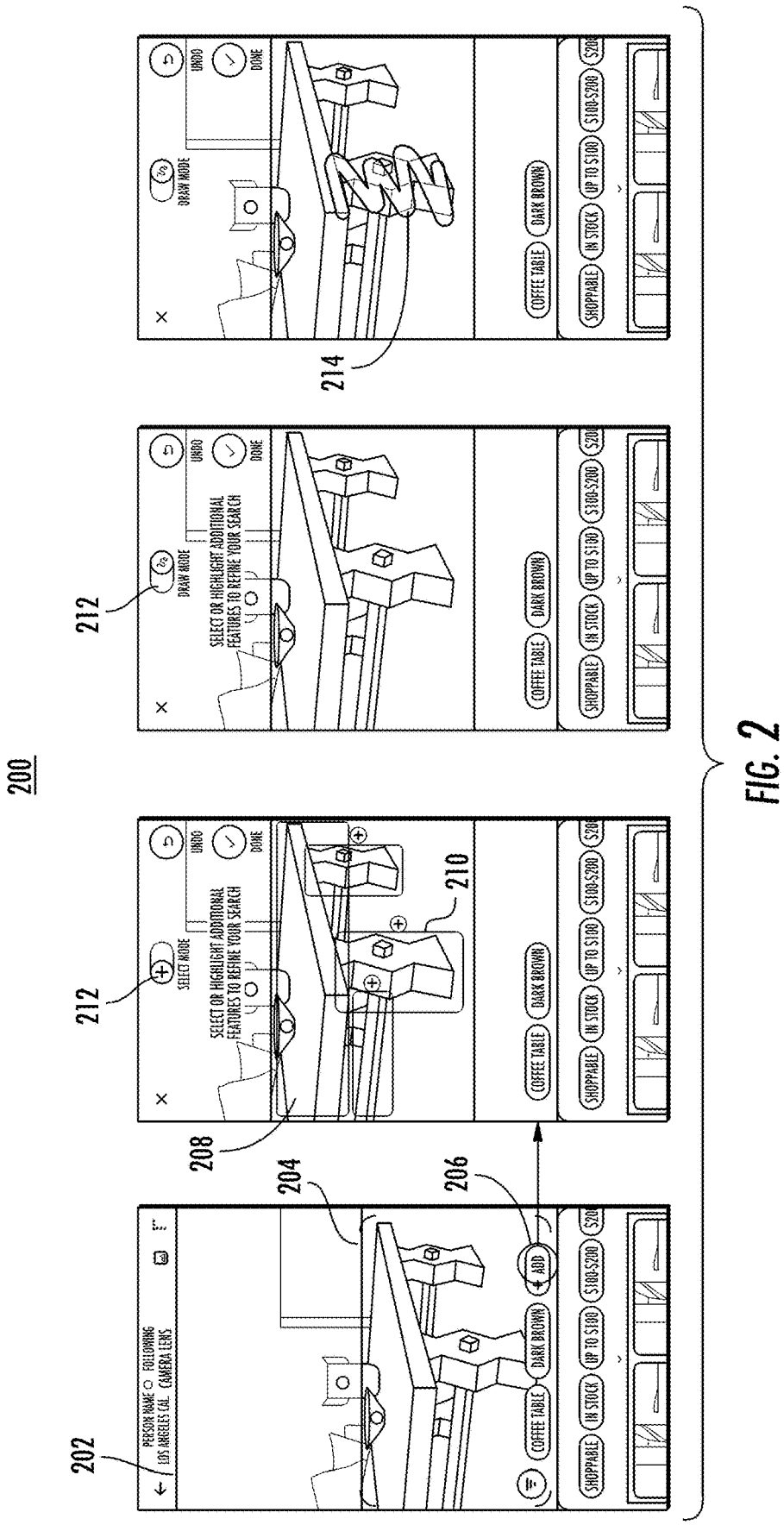
FIG. 2 illustrates an example user interface illustrating steps a user may take to perform a free-form selection of a visual feature to a visual query, in accordance with some embodiments.

At 404, the computing system can receive a free-form user input to the user interface that selects a particular sub-portion of the one or more objects depicted by the image (e.g., user input component 122 may include the free-form user input overlayed on the image as illustrated by FIG. 2 provided by the camera 124 of FIG. 1). The particular sub-portion can comprise one or more visual features (e.g., visual features can include decorative features of furniture, particular cuts of sleeves on clothing items, etc.)

At 406, the computing system can provide a visual search query that comprises the particular sub-portion of the object selected by the free-form user input (e.g., the visual search query can be received by the visual search system 104 to be processed by the query processing system 154 of FIG. 1).

At 408, the computing system can receive (e.g., from the visual search system 104 of FIG. 1), a set of visual search results (e.g., content 160 of FIG. 1) responsive to visual features included in the particular sub-portion of the one or more objects (e.g., content including a particular furniture decorative feature indicated by free-form user overlay of a swathe of translucent color on an image provided by the camera 124).

FIG. 2 illustrates an example implementation of the method described in FIG. 4. 202 illustrates a first image a user can submit as precursor to a visual query. The user can then specify a second portion of the image that the user wishes to perform a visual query on 204. The user interface may include a switch, toggle, or other user interface element such as an "add" button 206 to indicate that the user wishes to proceed with the visual query with the constraints placed 204.

Once the visual query is submitted, the user interface may alter the image framing (e.g., to enlarge the portion of the image the user indicated as wanting to perform an image search on 208). The user interface can then provide one or more initial visual feature suggestions 210. If the user does not wish to proceed with any of the initial visual feature suggestions 210 provided, the user can select an input mode toggle button 212 that can place the user interface in a free-form user selection mode instead. Once the user interface has been placed in the free-form user selection mode, the user can provide user input that selects a particular sub-portion of the image. In response, the user interface can display a swathe of translucent color 214 to overlay on the particular sub-portion of the object to indicate interest in the visual feature underneath the swathe of translucent color to integrate into the visual search (e.g., the coffee table leg).

Figure 3:
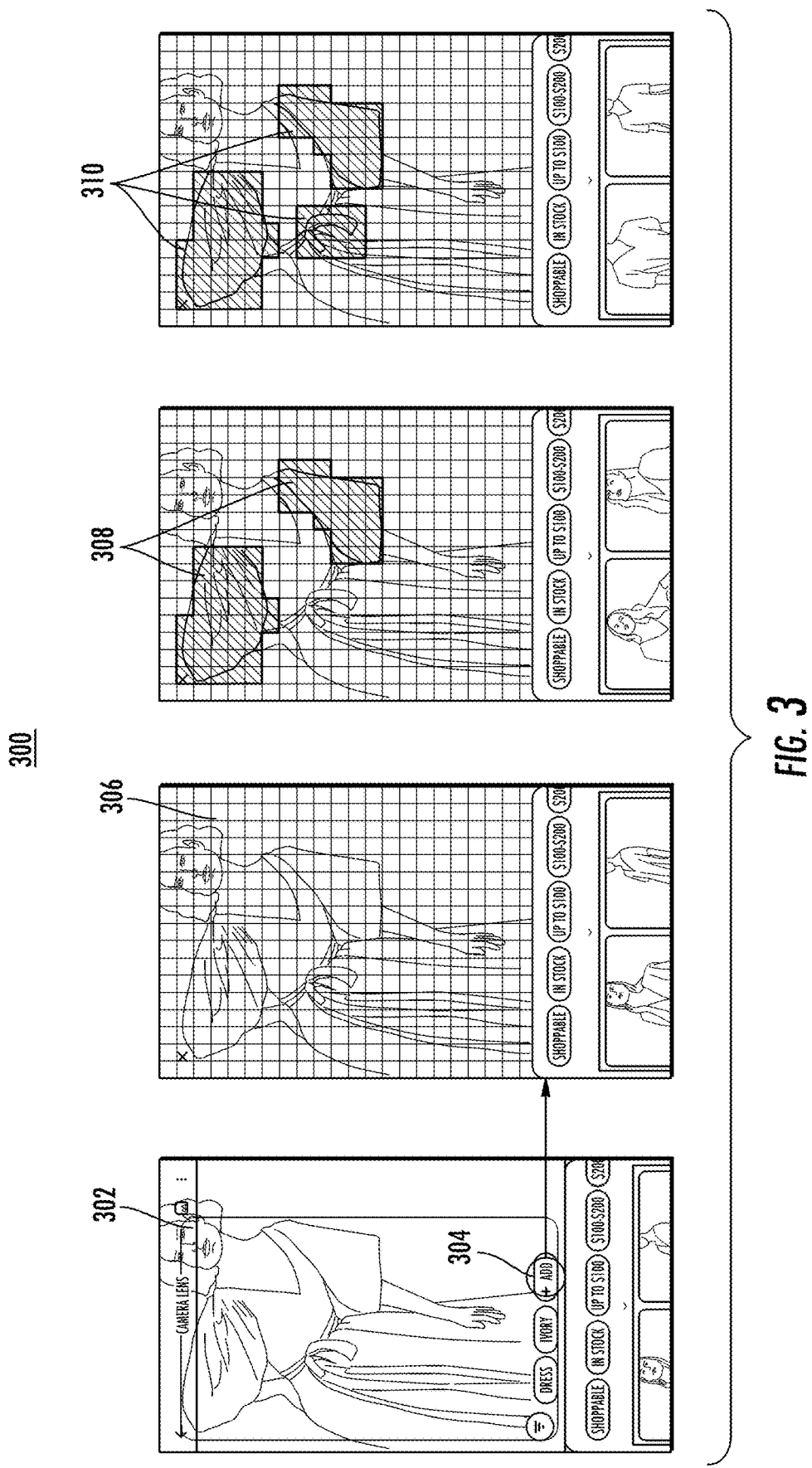
FIG. 3 illustrates an example user interface illustrating steps a user may take to perform a free-form selection of a visual feature to a visual query, in accordance with some embodiments.

In some implementations, the particular sub-portion of the one or more objects can be indicated by a subset of pixels selected by the user from a plurality of pixels that make up an image (e.g., provided by the camera 124 of FIG. 1) such as illustrated by FIG. 3. Similarly to what was illustrated by FIG. 2, it can be seen that the user can first submit a first image as a precursor to the visual query constraining the raw image to a section of the image 302 before selecting a toggle or other user interface element such as an "add" button 304 to indicate that the user wishes to proceed with the visual query with the constraints placed 302. FIG. 3 illustrates how the user interface can then be placed in a pixeled grid structure 306. The user can then select which pixels contain visual features that the user wishes to integrate into the visual search in particular 308 (e.g., the puffed sleeves). 310 illustrates that more than one feature may be selected (e.g., puffed sleeves and bow) as well so that more than one visual feature is incorporated into the visual search. Furthermore, none of the selected pixels need to be adjacent to another.

Figure 5:
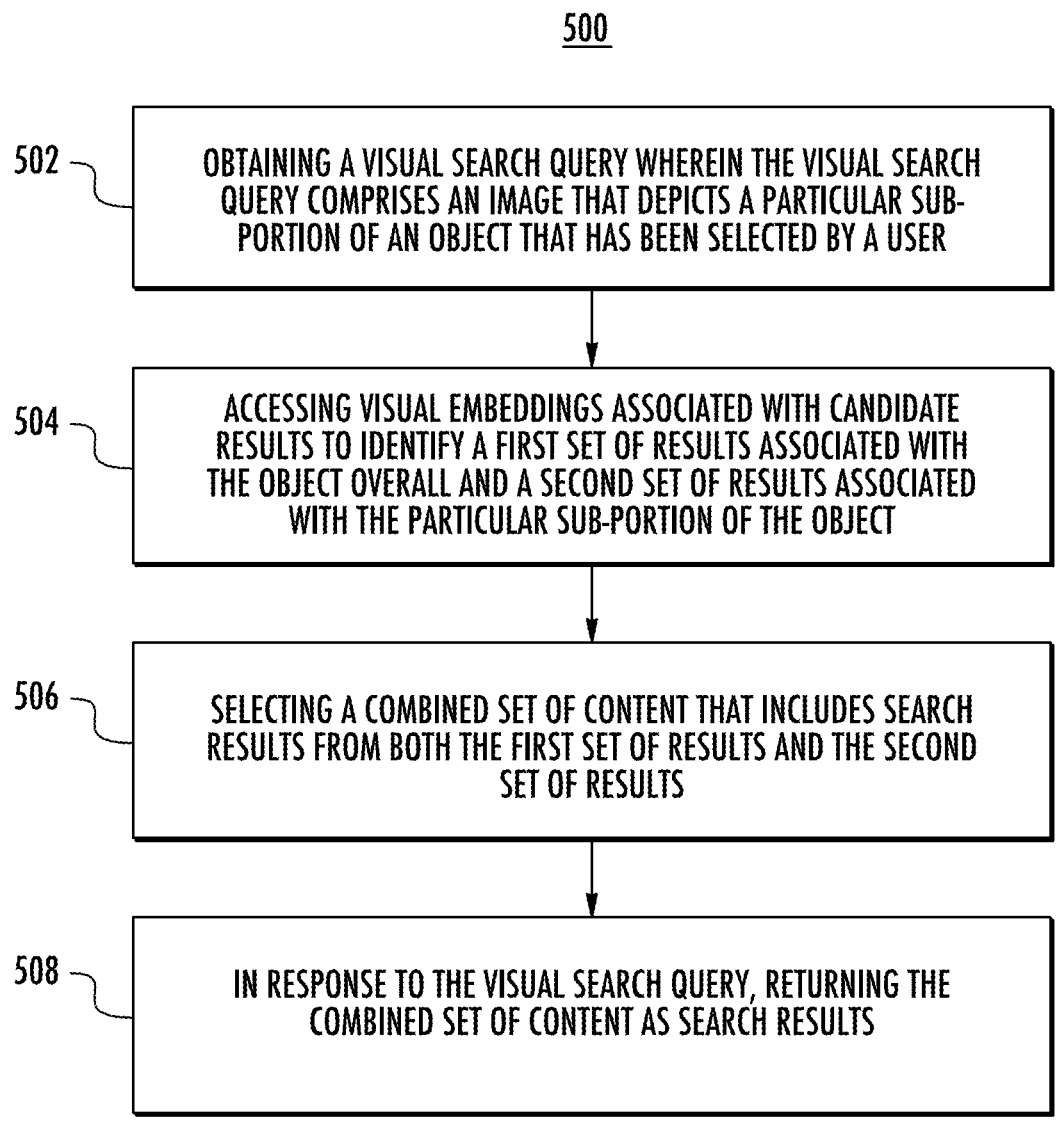
FIG. 5 depicts a flow chart diagram of an example method to perform a more personalized and/or intelligent visual search using a combined set of content including results associated with the object overall and results associated with a particular sub-portion of the object, according to example embodiments of the present disclosure.

FIG. 5 depicts a flow chart diagram of an example method 500 to provide more personalized search results according to example embodiments of the present disclosure. Although FIG. 5 depicts steps performed in a particular order for purposes of illustration and discussion, the methods of the present disclosure are not limited to the particularly illustrated order or arrangement. The various steps of the method 500 can be omitted, rearranged, combined, and/or adapted in various ways without deviating from the scope of the present disclosure.

At 502, a computing system can obtain a visual search query (e.g., the visual search system 104 of FIG. 1). The visual search query can comprise an image that depicts a particular sub-portion of an object that has been selected by a user (e.g., the user input component 122 of FIG. 1). More particularly, the selected sub portion can include free-form user overlay of a swathe of translucent color on an image as illustrated in FIG. 2 (e.g., provided by the camera 124 of FIG. 1). As another example, the selected sub portion can leverage a subset of pixels selected by the user from a plurality of pixels that make up an image (e.g., provided by the camera 124 of FIG. 1) such as illustrated by FIG. 3.

At 504, the computing system can access visual embeddings. More particularly, the computing system can access visual embeddings associated with candidate results (e.g., the object recognizer 152 of FIG. 1). The visual embedding associated with candidate results can be embedding associated with candidate results can be used to identify a first set of results associated with the object overall (e.g., a dress that is of midi length) and a second set of results associated with the particular sub-portion of the object (e.g., puffed sleeves).

At 506, the computing system can select a combined set of content that includes search results from both the first set of results and the second set of results (e.g., the ranking system 156 of FIG. 1). More particularly, the combined set of content can be ranked, prioritizing results associated with the object overall, the first set, and the particular sub-portion, the second set to be ranked earlier. Even more particularly, content can be ranked to prioritize results that are from the first set of results over the second set of results or vice versa.

At 508, the computing system can return the combined set of content as search results (e.g., as content 160 of FIG. 1). More particularly, the combined set of content can be returned as search results in response to the visual search query.

ADDITIONAL DISCLOSURE

The technology discussed herein makes reference to servers, databases, software applications, and other computer-based systems, as well as actions taken and information sent to and from such systems. The inherent flexibility of computer-based systems allows for a great variety of possible configurations, combinations, and divisions of tasks and functionality between and among components. For instance, processes discussed herein can be implemented using a single device or component or multiple devices or components working in combination. Databases and applications can be implemented on a single system or distributed across multiple systems. Distributed components can operate sequentially or in parallel.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations and/or additions to the present subject matter as would be readily apparent to one of ordinary skill in the art. For instance, features illustrated or described as part of one embodiment can be used with another embodiment to yield a still further embodiment. Thus, it is intended that the present disclosure cover such alterations, variations, and equivalents.

What is claimed is:

1. A computer-implemented method for free-form user selection of visual features for visual search, the method comprising:
    providing for display, by a computing system comprising one or more processors, an image that depicts one or more objects;
    receiving, by the computing system and via a user interface, a free-form user input to that selects a subset of pixels of the image;
    generating, by the computing system, a visual search query based on the image and the free-form user input, wherein the visual search query comprises a particular sub-portion of the image, wherein the particular sub-portion comprises one or more visual features, wherein generating the visual query comprises:
        determining, by the computing system, the particular sub-portion of the one or more objects selected by the free-form user input based on the subset of pixels; and
        determining, by the computing system, the particular sub-portion of the image selected by the free-form user input based on the subset of pixels and the one or more visual features;
    processing, by the computing system, the visual search query that comprises the particular sub-portion selected by the free-form user input to identify a set of visual search results responsive to visual features included in the particular sub-portion of the image; and
    providing, by the computing system, one or more of the set of visual search results for display.

2. The method of claim 1, wherein providing for display the image that depicts the one or more objects comprises:
    providing, by the computing system, a video for display.

3. The method of claim 2, wherein the visual search query comprises sub-portions of a plurality of frames associated with a subset of the video.

4. The method of claim 1, further comprising:
    providing for display, by the computing system and via the user interface, a translucent color overlay indicating the particular sub-portion of the image selected by the free-form user input.

5. The method of claim 1, wherein the one or more visual features are associated with a sub-portion of the one or more objects, and wherein the particular sub-portion of the image comprise pixels descriptive of the sub-portion of the one or more objects.

6. The method of claim 1, wherein the image comprises a plurality of pixels, and wherein the subset of pixels are a subset of the plurality of pixels.

7. The method of claim 1, wherein the image is provided for display via a touch sensitive display device.

8. The method of claim 7, wherein the free-form user input is received via the touch sensitive display device.

9. The method of claim 8, wherein the free-form user input is provided by a tactile object, wherein the tactile object comprises at least one of a finger or a stylus.

10. The method of claim 1, further comprising: before receiving the free-form user input:
   receiving, by the computing system, a selection of an input mode toggle of the user interface; and
   switching, by the computing system, to a free-form user selection mode of the user interface.

11. A computing system for free-form user selection of visual features for visual search, the system comprising:
   one or more processors; and
   one or more non-transitory computer-readable media that collectively store instructions that, when executed by the one or more processors, cause the computing system to perform operations, the operations comprising:
      providing for display an image that depicts one or more objects;
      receiving, via a user interface, a free-form user input to that selects a subset of pixels of the image;
      generating a visual search query based on the image and the free-form user input, wherein the visual search query comprises a particular sub-portion of the image, wherein the particular sub-portion comprises one or more visual features, wherein generating the visual query comprises:
         determining the particular sub-portion of the one or more objects selected by the free-form user input based on the subset of pixels; and
         determining the particular sub-portion of the image selected by the free-form user input based on the subset of pixels and the one or more visual features;
      processing the visual search query that comprises the particular sub-portion selected by the free-form user input to identify a set of visual search results responsive to visual features included in the particular sub-portion of the image; and
      providing one or more of the set of visual search results for display.

12. The system of claim 11, wherein the free-form user input comprises a circle.

13. The system of claim 12, wherein a size of the circle is determined based on a click and slide touch input.

14. The system of claim 11, wherein the operations further comprise:
   receiving a selection of an input mode toggle button; and
   providing the user interface in a free-form user selection mode.

15. The system of claim 14, wherein providing a user interface in a free-form user selection mode comprises providing for display a swathe of translucent color to overlay on the particular sub-portion of the object to indicate interest in the one or more visual features.

16. The system of claim 14, wherein the user interface is provided as part of a visual search application on a user computing device.

17. One or more non-transitory computer-readable media that collectively store instructions that, when executed by one or more computing devices, cause the one or more computing devices to perform operations, the operations comprising:
   providing for display an image that depicts one or more objects;
   receiving, via a user interface, a free-form user input to that selects a subset of pixels of the image;
   generating a visual search query based on the image and the free-form user input, wherein the visual search query comprises a particular sub-portion of the image, wherein the particular sub-portion comprises one or more visual features, wherein generating the visual query comprises:
      determining the particular sub-portion of the one or more objects selected by the free-form user input based on the subset of pixels; and
      determining the particular sub-portion of the image selected by the free-form user input based on the subset of pixels and the one or more visual features;
   processing the visual search query that comprises the particular sub-portion selected by the free-form user input to identify a set of visual search results responsive to visual features included in the particular sub-portion of the image; and
   providing one or more of the set of visual search results for display.

18. The one or more non-transitory computer-readable media of claim 17, wherein the image is received and stored in a content cache.

19. The one or more non-transitory computer-readable media of claim 17, wherein the image is an image search query, and wherein the visual search query is a targeted search query.

20. The one or more non-transitory computer-readable media of claim 17, wherein the set of visual search results are responsive to visual features included in the particular sub-portion.

* * * * *